Feb. 4, 1969  D. YOUNGQUIST  3,426,257

MULTIPLE CAPACITOR AND METHOD OF MAKING THE SAME

Filed Oct. 19, 1967

INVENTOR
DAVID YOUNGQUIST
BY

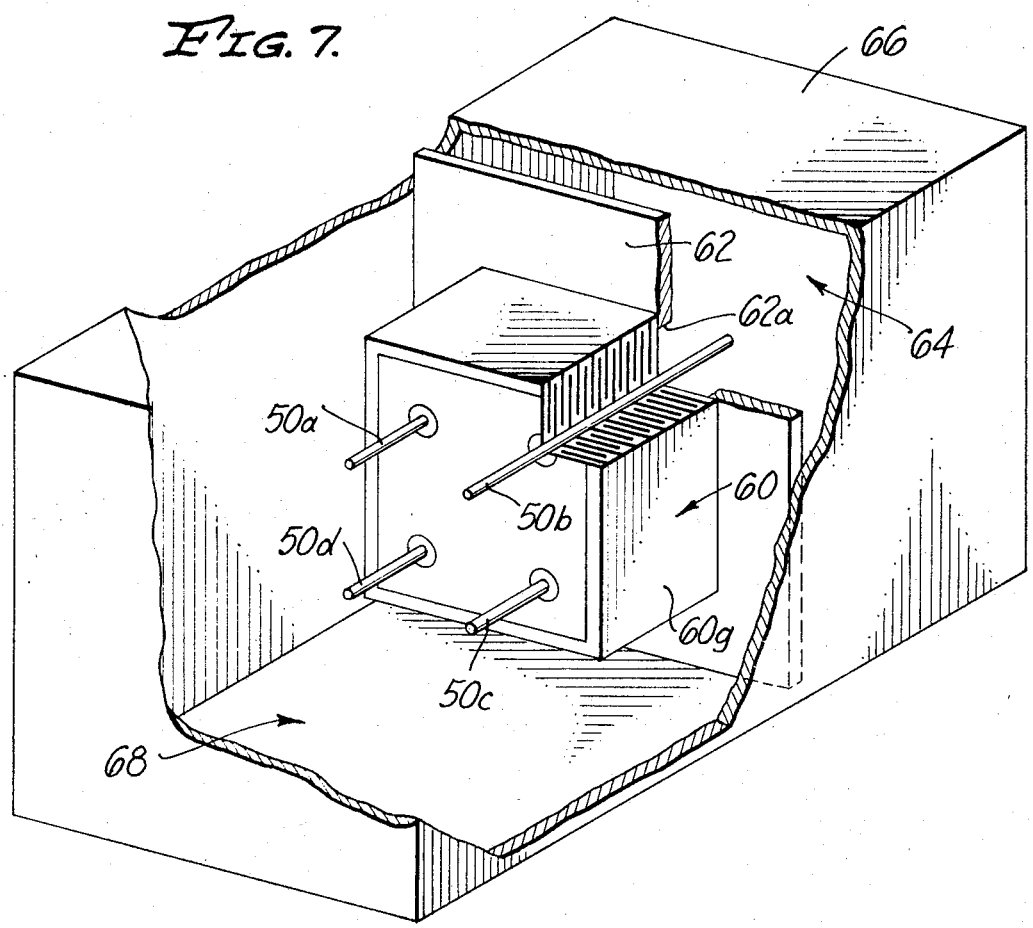

United States Patent Office 3,426,257
Patented Feb. 4, 1969

3,426,257
MULTIPLE CAPACITOR AND METHOD
OF MAKING THE SAME
David Youngquist, Newhall, Calif., assignor, by mesne assignments, to David Youngquist, doing business as Dave Youngquist & Company, Burbank, Calif., a sole proprietorship
Filed Oct. 19, 1967, Ser. No. 676,592
U.S. Cl. 317—256          5 Claims
Int. Cl. H01g 13/00

ABSTRACT OF THE DISCLOSURE

Electrical capacitor structure comprising an integral structure having alternating sets of thin conductive elements each encircled by a coplanar thin guard circuit conductor, and single thin conductive elements each spaced from sets of the guarded conductors by a thin portion of a monolithic dielectric ceramic structure, all forming sets of stacks of pairs of capacitor plates each separated from others by portions of a monolithic ceramic dielectric and all mounted to a grounded metal structure serving as a bulkhead disposed to magnetically and electrostatically isolate elements of a multielement filter; single leadthrough conductors each interconnecting like-polarity capacitor conductive elements of a respective capacitor and passing through the bulkhead and serving as capacitor terminals and for transmission of low-frequency information-signals through the bulkhead while permitting the bulkhead to form a barrier opaque to radio frequency (RF) energy. The ground (and guard-circuit conductors) of the capacitive stacks completely surround the capacitors, whereby no RF energy can pass from one capacitor section to another.

---

This invention pertains to filter-circuits and more particularly to filter-circuit capacitors and methods of constructing and using such capacitors whereby there is attained a notable decrease in size and whereby such capacitors occupy less of otherwise useful space. Principally those ends are attained by so constructing the capacitors that they become a portion of the filter enclosure, or a portion of the shield between filter sections. Also, both size, and cost, of the capacitors are decreased by constructing a plurality of capacitors in a unitary form. Another advantage of the construction according to the invention is that a grounded conductor or "guard circuit" is disposed between capacitor sections whereby coupling between capacitors is reduced. Further, the filter circuit capacitors constructed according to the invention are much stronger mechanically and much more resistant to adverse effects of unfavorable environments than are prior-art filter capacitors.

One undesirable result of decreasing the size of filter parts pursuant to the trend toward miniaturization of electronic components is that the mutual coupling between the parts is increased, which results in degradation of the performance of the filter. That disadvantage is obviated in filters constructed according to the present invention, by constructing the capacitors so they serve as portions of the filter enclosure or housing, or as shields between next-adjacent sections of the filter.

Also in accord with the invention, and providing one of the important novel features of the invention, a grounded conductor is arranged between next-adjacent capacitor sections whereby to provide an inter-section shield or "guard circuit." A dual advantage is gained, according to the invention, by the construction, in that the coupling between adjacent units is reduced while the size is reduced and concurrently strength of the structure is increased.

In accord with the invention, layers or wafers of a ceramic dielectric material interleaved with conductive films or "plates" are superimposed or stacked so that alternate ones of the films or plates are electrically interconnected and connected to a conductor extending transversely through the central portions of conductive areas or "plates" of the wafers, the intervening conductive plates being electrically interconnected and connected to a "ground" conductor extending around the perimeter of the capacitor, i.e., to the guard circuit. Further, the latter wafers are provided with bare insulated areas next adjacent to the transversely extending conductor or conductors. The ceramic wafers, which may be very thin, preferably have the conductive plates and electrical connections applied thereto as by printing or silk screening or the like while the ceramic wafers are in the greenware stage. The ungrounded "plates" or electrodes may number but one to a wafer, or there may be a plurality of such plates on each alternate insulative wafer, in which case a guard conductor is disposed between next-adjacent plates, to reduce coupling therebetween. The wafers are stacked, pressed, cut to size, and one (or a plurality) of conductor holes are made, and the greenware fired to make a finished product, all as more extensively described in detail hereinafter.

The preceding brief general description of features of the invention make it evident that it is a principal object of the invention to provide improvements in electrical filters.

Another important object of the invention is to provide improvements in capacitors especially adapted for use in electrical filter circuits.

The aforementioned objects and other objects and advantages of the invention are hereinafter set out or made evident in the appended claims and the following detailed description of a preferred mode and construction according to the invention, reference being made in the description to the appended drawings in which:

Figure 6:
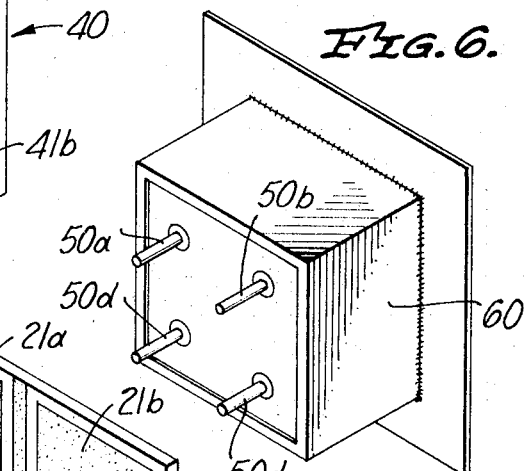

FIGURE 6 is a pictorial representation of one preferred type of multiple-unit capacitor device according to the invention, in finished form ready for use and housed in a metal frame; and FIGURE 7 is a pictorial view of a filter structure, with portions broken away, illustrating the arrangement of a set of capacitive filter elements on a conductive bulkhead, with guard circuit and ground means of the capacitive filter elements connected to the bulkhead and illustrating the extension of inner capacitor leads through the bulkhead into an adjacent chamber of the filter housing portion of the structure for connection therein to a magnetic component of a filter.

Figure 1:
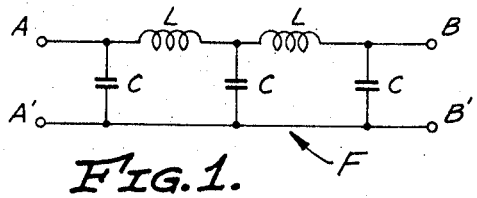
FIGURE 1 is a diagrammatic representation of an exemplary electrical filter circuit or network, with input terminals and output terminals.

Referring to FIGURE 1, a simple common electrical filter network is depicted, comprising input terminals A and A', output terminals B and B', and a plurality of capacitive units C and inductive units L connected as indicated, between the input and output terminals. Other types of filter networks utilizing capacitive units are well known.

Figure 2:
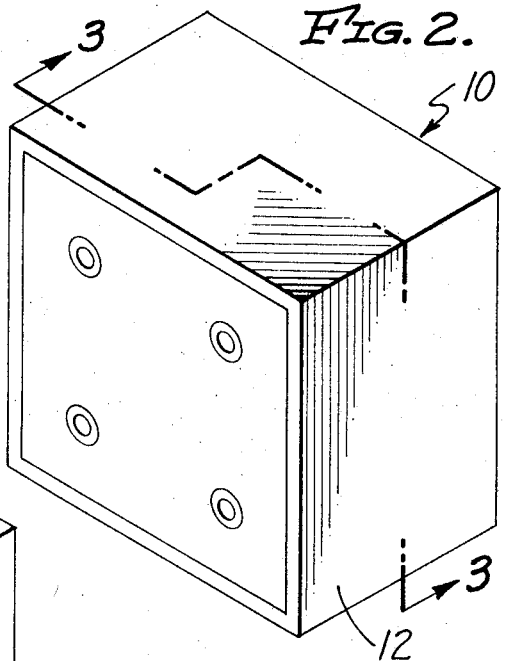
FIGURE 2 is a pictorial representation of an exemplary multiple-unit capacitive device according to the invention.

In FIGURE 2 is depicted a monolithic structure 10 comprising a plurality of capacitive units C, prior to application of termnials. The monolithic structure shown comprises an external coat or fired-on layer 12 of conductive material, such as platinum or gold or a frit made predominantly of silver, and which coat serves as a ground terminal for all of the capacitor units or sections. Further details of construction, and characteristics, of the unitary monolthic capacitive device comprising a plurality of capacitors or capacitive sections will be made evident from the following step-by-step description of the construction of a completed unit.

Thin ceramic greenware wafers are made by milling, for example, the dry ingredients listed in Table I, with the toluene and dichloroethylene there listed, for an exemplary period of twenty-four hours. The ethyl cellulose and santizer are then added and the entire material milled for twenty-four hours. Trapped air is removed from the resultant slurry, and the slurry spread in even sheets on horizontal glass strips. The slurry is preferably applied via a doctor blade, whereby uniformity of thickness is assured. The deposited film or layer of slurry, which may be of selected thickness, for example, of .003 inch, is dried and becomes a leathery sheet capable of being handled. From such sheets, pieces such as 20 and 21 (FIGURES 4 and 5), slightly larger than the desired wafers are cut. The size depends upon how many wafers are to be stacked or superimposed, and how many electrodes per wafer are to be provided on alternate wafers. Those matters are determined by wafer thickness, dielectric constant of the ceramic, voltage rating and desired capacitance of the capacitor units or sections, etc.

Table I

| | | |
|---|---|---|
| $BaTiO_3$ | grams | 901.0 |
| $PbSnO_3$ | do | 29.0 |
| $CaSnO_3$ | do | 19.5 |
| $Ba_2(SnO_3)_3$ | do | 81.5 |
| Cobalt titanate | do | 4.0 |
| Manganese nitrate | do | 2.0 |
| Ethyl cellulose N/50 | do | 80.0 |
| Santicizer® 160 (Monsanto Chemical Co.) | do | 55.5 |
| Toluene | ml | 1,000.0 |
| Dichloroethylene | ml | 600.0 |

Upon the required number of alternate, or multi-electrode wafers, there are applied (by silk screening, for example) a pattern of conductive metal paint or ink which preferably is composed of from about 42 percent to about 50 percent by weight of platinum black dispersed in a liquid vehicle such as Acryloid F–10 (manufactured by Rhom and Haas) dispersed in kerosene to make a thin paste (viscosity, e.g., 2500 cps.). The pattern of the applied conductive ink, in the case of the exemplary four-section monolithic capacitive device illustrated in FIGURES 2, 3, and 6 is illustratively depicted in FIGURE 5 which shows a ceramic greenware wafer 20 with applied conductive capacitor electrodes or elements 21a, 21b, 21c, and 21d; and a guard circuit conductor or element 22.

Figures 4, 5:
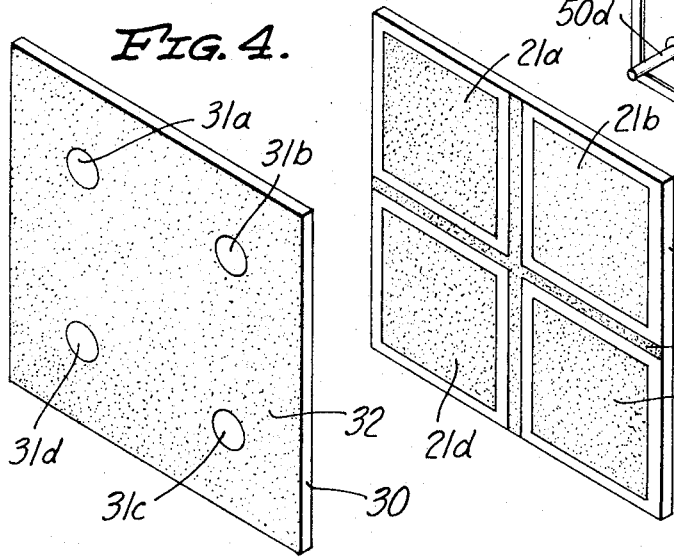
FIGURE 4 is a diagram illustrating an exemplary conductive pattern or pattern of an array of conductive elements as applied to a preferably ceramic insulation wafer to form an array for a first type of multiple-unit capacitor plate or electrode.
FIGURE 5 is a diagram similar to FIGURE 4 but illustrating the conductive pattern or array for a second type of multiple-unit capacitor plate.

Similarly, a conductive ink layer or film, of pattern such as shown at 32 on a ceramic greenware wafer 30 in FIGURE 4, is applied to a second plurality or set of wafers which are to be disposed intervening relationship with wafers such as 20 of the first set. The conductive ink 32 of the second pattern covers the entire face area of the wafer 30 except for generally circular areas 31a, 31b, 31c, and 31d which are located at regions where respective interelectrode conductors for the several electrodes of the alternate wafers are to be disposed, as will presently be made more fully evident.

Following integration of the assembled wafers into a upon the greenware wafers, the required number of wafers 20 and an equal number of wafers 30 are assembled into a stack in alternating relation, with conductive patterns all facing the same direction. Care is exercised that the wafers are accurately in register. An unpainted or blank wafer is then disposed over the end of the stack having the exposed ink pattern; and thereafter the stack is placed in a die press and subjected to high pressure such as, for example, 8000 pounds per square inch, to form a unitary mass of ceramic greenware with sets of ink electrodes of first and second patterns alternating throughout the mass. Following the pressing of the wafer into an integral mass, through-holes such as those depicted at 35a, 35b, 35c, and 35d in FIGURE 3 are formed, as by punching or drilling, through the monolith as indicated. The through-holes are accurately located at the centers of the aforementioned unpainted circular areas 31a, etc. (FIGURE 4), and are of diameter considerably smaller than are the unpainted areas, whereby there remains at each of areas 31a, etc., a hole or aperture encircled by a non-conductive annular region which serves to isolate and insulate the respective electrode or layer 32 from conductors which will later be disposed in respective ones of the through-holes.

Figure 3:
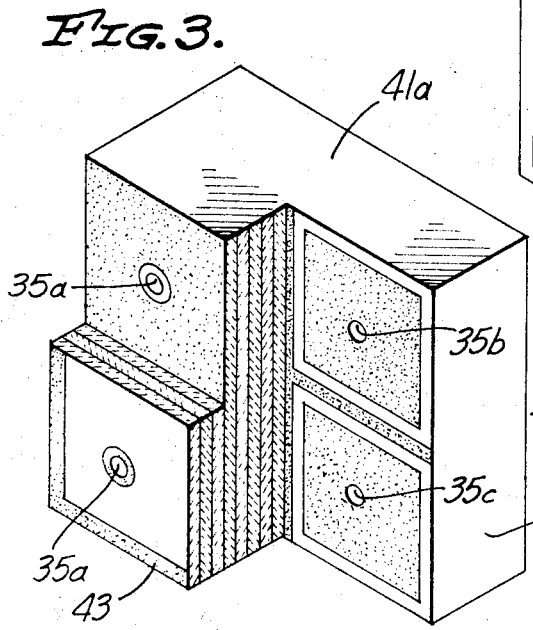
FIGURE 3 is a modified sectional view of the structure depicted in FIGURE 2, certain capacitive elements having been added but otherwise the section being taken as indicated by broken line 3—3 of FIGURE 2.

Following integration of the assembled wafers into a monolith 40 (FIGURE 3), the outside edge surfaces such as 41a, 41b, etc., are given a coating of conductive ink, and the ink applied over a narrow marginal area as at 43 (FIGURE 3). Thereafter the thus treated ceramic greenware structure is kiln-fired, typically through a firing cycle that includes a pre-firing heating period during which the temperature is gradually and substantially uniformly increased from 25° C. to 750° C. during a period of twenty-four hours and during which pre-firing the volatile and organic components of the structure are driven out in gaseous form to leave only high-temperature ceramic and metal components. The pre-firing is immediately followed by firing, typically for four to six hours at about 1350° C. in the case of the ceramic composition detailed in Table I. Firing is carefully optimized by test or preliminary batches to determine, for a particular kiln, the optimum temperature and cycle times, for each ceramic composition employed.

Following firing of the monolith or capacitive slug, the inside surfaces of the through-holes are rendered conductive, preferably by application of a coating of silver paste or paint formed by mixing mostly silver powder with a small percentage of glass frit or bismuth oxide and No. 373 high viscosity vehicle (manufactured by The Interchemical Corporation of Los Angeles), the paint or paste thinned with mineral spirits to desired consistency. Thereafter the monolith is fired for fifteen minutes at from 750° C. to 920° C. As is evident, other conductive paints or pastes may be used, such as one containing gold or palladium. Thereafter, conductive terminal wires or members, such as those depicted at 50a, 50b, 50c, and 50d in FIGURE 6, are disposed in respective through-holes and soldered in place, and the device is inspected and tested. The capacitive device or "slug" as thus produced may be used in that form, or may, as indicated in FIGURE 6, be sealed in a metal enclosure or mount, 60, which obviously may be formed and proportioned to contain other electrical elements of the filter circuit F which is illustrated in FIGURE 1. As an example of such a composite filter comprised in a unitary filter structure incorporating essentials of the invention, there is shown in FIGURE 7 a unitary capacitive structure 60 of the character of that shown in FIGURE 6 and described in connection with the latter figure, the capacitive structure being one component of a radio-frequency interference (RFI) filter and comprising four sets of pairs of capacitor electrodes each set of which includes a respective high-potential lead or conductor such as 50a, 50b, 50c, and 50d, and ground conductor and guard-circuit conductors all interconnected and forming an encircling ground sheath 60g. The capacitive structure 60 is mounted upon a conductive bulkhead 62 to which it is sealed around the base periphery of the capacitive structure, and is arranged with the high-potential conductors sealed in insulation in respective apertures (such as 62a) in the bulkhead by sealant (not shown). Thus the conductors 50a, 50b, 50c, and 50d, for example, extend through but are insulated from, a conductive barrier formed by the bulkhead 62 and the ground sheath 60g. The conductors extend into a chamber 64 formed by the top, bottom, and side plates of a box-like metal housing 66, in cooperation with bulkhead 62 and the end wall of the housing. In the noted chamber 64 the conductors are disposed to be connected to other (non-capacitive) portions of the filter network, for example, inductive or other magnetic components (not shown). Thus the capacitive unit 60 is isolated from chamber 64 by means forming a barrier that is substantially opaque to RFI waves, but is directly connected to the components in the chamber by the lead-through conductors 50a, 50b, 50c, and 50d, for direct-current or very low frequency energy. As is now evident, the entire structure is such that space and material are very efficiently utilized, the housing (and bulkhead) means serving both to form an extremely strong protective housing and to magnetically isolate the filter components against passage of undesired RF energy. As is also evident, the bulkhead may be soldered around its periphery to the interior walls of housing 66; and following connection of capacitor leads such as 50a and 50b to other electric filter circuit components and placement of the latter in chamber 64, the enclosed components may be plotted and the end wall of housing 66 soldered to the top, bottom, and side walls. Further as is made evident in FIGURE 7, other filter network components or adjuncts may be plotted in one or more other chambers provided by the space 68 in housing 66, with additional bulkheads as may be desired; or, alternatively, the exterior housing 66 may be foreshortened. External electrical connections may be by way of an conventional electrical connector sealed to the housing, or the latter may be provided with a conventional insulative header having lead-through or plug-in terminals, either according to well known electrical termination practice. As is further evident, the electrical capacitance of the capacitors, and the number of capacitors comprised in the filter structure, may be widely varied without change of space allotted to the capacitive units in housing 66, by increasing or decreasing the number of electrodes or plates, and the number of conductor leads, it being evident that a large number of plates or electrodes are accommodated in a very thin space in the housing.

The preceding detailed description of a preferred exemplary form of structure, and the mode and exemplary materials used, according to the invention, indicates full attainment of the noted objectives of the invention. In the light of that detailed disclosure it will be evident to others skilled in the art that modifications within the true spirit and scope of the invention are numerous; for example, other dielectric ceramic compositions may be used, and other resins, plasticizers and liquid solvents may be used. Also the number of capacitive elements per capacitive unit or "stack," and the number of stacks or units per monolithic device may be more or less than those shown in the illustrative exemplary device. And while square capacitive elements are preferred, other rectangular shapes may be used, for example, in instances where such shapes are dictated by dimensional requirements of other electronic components with which the device is to be used. Also, as will be evident, other procedures may be followed in producing the conductive coatings or patterns on the ceramic substrates. For example, the following procedural steps may be followed: (a) electroless plate with copper or nickel to produce a "flash" conductive coating or film, (b) copper plate by electroplating, to a thickness of, for example, .0005 inch to .003 inch, (c) apply pattern of resist, and etch away unprotected conductive film to leave desired pattern of conductive elements, (d) electroplate conductive films with gold. Those are steps common to etched-circuit practice widely used in electronic circuit production. Thus, it is desired that the scope of the invention by not restricted to details of the exemplary illustrative device shown and described, except as is required by the appended claims.

I claim:

1. A filter device including an integral capacitive device comprising a unitary ceramic dielectric monolith containing therein in superimposed relationship a first set of parallel capacitor ground electrodes extending in substantially planar form from exterior border to exterior border of the monolith and generally parallel each to others thereof and each such ground electrode having a plurality of areal voids therein, and said monolith further containing therein a second set of smaller capacitor electrodes disposed in parallel relation between electrodes of said first set but insulated therefrom by respective thin portions of said monolith, and there being between two electrodes of said first set at least two substantially coplanar electrodes of said second set each insulated from the other by said monolith, and a plurality of terminal conductors each extending through aligned ones of the areal voids in said electrodes of the first set and each insulated from the other and from said electrodes of said first set and electrically contacting aligned parallel electrodes of a respective group of electrodes comprised in the said set of smaller electrodes, and means electrically inter-connecting the electrodes of said first set, whereby said monolith contains a plurality of capacitors having a common ground connection and respective other individual terminals, all disposed in a compact spatial arrangement.

2. A filter device according to claim 1, in which guard-circuit conductor means are contained in said monolith disposed in coplanar relationship with respective ones of the electrodes of said second set and encircling and shielding each such electrode from all others thereof and insulated by said monolith from all of said electrodes of said second set of electrodes and from said terminal conductors, said guard-circuit conductor means being electrically connected to the electrodes of said first set.

3. A method of producing a multiple-unit integral capacitive device composed essentially of a monolithic dielectric structure containing a plurality of capacitor units each comprising a plurality of superimposed parallel electrodes of first and second sets thereof, and terminal conductors, said method including the steps of:

forming a plurality of thin rectangular wafer-like sheets of dielectric ceramic greenware;

disposing on one face of each of a first set of said sheets a patterned coat of adherent conductive material extending from border to border thereon but having spaced-apart small areal voids to provide thereon thin capacitor electrodes with spaced areal voids;

disposing on one face of each of a second set of said sheets an array of spaced-apart thin coats of adherent conductive material to provide on each sheet of said second set an array of capacitor electrodes smaller than those on said first set of sheets, and each electrode of said array being areally disposed to register with a respective one of said areal voids when sheets of said first and second sets are superimposed in alternation in a stack;

stacking said first and second sets of sheets in superimposed relationship with coated faces of all of the sheets facing the same direction;

subjecting the stack of coated sheets to high pressure in a die press to unite the sheets into a monolithic structure containing sets of conductive electrodes;

forming holes transversely through the monolithic structure so each hole extends through a middle portion only of each of a respective set of superimposed voids of said first set of sheets;

firing the unitary structure to form a dense rigid monolithic structure; and applying conductive material over the interior surfaces bounding said holes whereby to electrically interconnect the respective electrodes of said second set of sheets, and separating interconnecting said thin capacitor electrodes.

4. A method as defined in claim 3, including the step of applying a thin conductive stripe between next-adjacent electrodes on the face of each of said second set of ceramic sheets, and electrically connecting the said stripes to the electrodes on said first set of ceramic sheets, whereby to provide a guard means electrostatically isolating next-adjacent ones of the smaller electrodes each from the other.

5. A method as defined in claim 3, including the step of mounting said monolith on a metal bulkhead and electrically connecting said thin capacitor electrodes to said bulkhead.

References Cited

UNITED STATES PATENTS 3,278,815   10/1966   Booe _____ 317—261 X

FOREIGN PATENTS 961,661   1/1948   France.

LEWIS H. MYERS, *Primary Examiner.*

ELLIOT GOLDBERG, *Assistant Examiner.*

U.S. Cl. X.R.

317—242, 261; 29—25.42; 174—52